(12) United States Patent
Obrist et al.

(10) Patent No.: US 11,802,538 B2
(45) Date of Patent: Oct. 31, 2023

(54) ENERGY TRANSMISSION SYSTEM AND INSTALLATION WITH A SUCH ENERGY TRANSMISSION SYSTEM

(71) Applicant: Oblamatik AG, Chur (CH)

(72) Inventors: Roland Obrist, Scharans (CH); Daniel Knupfer, Zizers (CH); Patric Cathomas, Flims (CH); Thomas Knupfer, Landquart (CH); Philipp Triet, Bad Ragaz (CH)

(73) Assignee: Oblamatik AG, Chur (CH)

( * ) Notice: Subject to any disclaimer, the term of this patent is extended or adjusted under 35 U.S.C. 154(b) by 0 days.

(21) Appl. No.: 17/715,790

(22) Filed: Apr. 7, 2022

(65) Prior Publication Data

US 2022/0325690 A1 Oct. 13, 2022

(30) Foreign Application Priority Data

Apr. 9, 2021 (CH) ..................................... 00364/21

(51) Int. Cl.
*F03B 17/06* (2006.01)
*H02K 7/18* (2006.01)

(52) U.S. Cl.
CPC ........... *F03B 17/06* (2013.01); *H02K 7/1823* (2013.01); *F05B 2220/20* (2013.01); *F05B 2220/706* (2013.01)

(58) Field of Classification Search
CPC ....... F03B 17/06; F03B 13/00; H02K 7/1823; F05B 2220/20; F05B 2220/706; F05B 2260/406; H02J 50/40
See application file for complete search history.

(56) References Cited

U.S. PATENT DOCUMENTS

| | | | | |
|---|---|---|---|---|
| 8,384,270 B2 * | 2/2013 | Huang | .................... | G10K 11/04 310/324 |
| 2009/0236852 A1 * | 9/2009 | Balzano | .................. | F03B 13/00 290/43 |
| 2012/0032560 A1 * | 2/2012 | Ochoa | ..................... | E21B 47/18 310/339 |
| 2013/0113631 A1 * | 5/2013 | Pitchford | .......... | H04W 52/0229 340/870.02 |
| 2021/0124323 A1 * | 4/2021 | Amin | ................... | G05B 19/042 |

* cited by examiner

*Primary Examiner* — Joseph Ortega
(74) *Attorney, Agent, or Firm* — Notaro, Michalos & Zaccaria P.C.

(57) ABSTRACT

An energy transmission system for a fluid line having a generator unit with a power supply unit that can be arranged at a first location of the fluid line and at least one consumer unit having at least one consumer that can be arranged at a second location of the fluid line spaced apart from the first location is disclosed. The generator unit has a pressure surge generator connected to the power supply unit and the pressure surges can be generated and introduced into the fluid located in the fluid line, and the consumer unit has a pressure surge transducer that is connected to the at least one consumer by the pressure surges introduced into the fluid and can be converted into electrical energy that can be supplied to the at least one consumer.

10 Claims, 2 Drawing Sheets

ENERGY TRANSMISSION SYSTEM AND INSTALLATION WITH A SUCH ENERGY TRANSMISSION SYSTEM

FIELD OF THE INVENTION

The present invention relates to an energy transmission system for fluid lines, in particular for plumbing installations with water lines.

DESCRIPTION OF THE PRIOR ART

Energy recovery systems for drinking water networks are known from the prior art, with which, for example, electrical energy can be generated with a turbine in flowing water, which can then be made available to devices that require electricity for their operation. Accordingly, these devices do not require a power supply connection and thus no cabling. However, such systems have the disadvantage that energy can only be generated when water is flowing. In addition, no electricity is generated if the flow velocity is too low. Furthermore, electricity is always generated when water is flowing, regardless of whether it is actually needed or not.

DESCRIPTION OF THE INVENTION

It is an object of the present invention to provide an energy transmission system for fluid lines which can supply electrical energy to a consumer independently of the consumption of fluid.

This object is solved by an energy transmission system having the features of claim 1. Further embodiments of the energy transmission system, as well as of an installation with such an energy transmission system, are defined by the features of further claims.

An energy transmission system for a fluid line according to the invention comprises a generator unit having a power supply unit, which can be arranged at a first location of the fluid line, and at least one consumer unit having at least one consumer, which can be arranged at a second location of the fluid line spaced from the first location. The generator unit comprises a pressure surge generator connected to the power supply unit, with which pressure surges can be generated which can be introduced into the fluid located in the fluid line. The consumer unit comprises a pressure surge converter connected to the at least one consumer, with which the pressure surges introduced into the fluid can be converted into electrical energy which can be supplied to the at least one consumer. This has the advantage that the at least one consumer does not require a wired power supply and receives power even when there is no fluid flowing or streaming in the line. A consumer is to be understood as a unit which consumes electrical current during operation. The energy transmission system according to the invention can be used in fluid lines as well as in gas lines.

In one embodiment, the at least one consumer comprises at least one sensor. Alternatively or additionally, it may comprise at least one actuator.

For example, a sensor includes a temperature sensor, a flow sensor, a position sensor, such as of the valve position, or a proximity sensor.

For example, the actuator comprises a valve. A consumer can also comprise several valves, for example in a mixing unit in which a hot water valve and a cold water valve are provided. A mixing unit may additionally comprise temperature sensors with which the mixing temperature, the cold water temperature and the hot water temperature are measurable.

Other examples of consumers include audible signaling devices, such as a speaker or beeper, visual indicators, such as lights or displays; lighting elements; control elements, such as input units, other sensors, such as humidity sensors; and radio range extenders.

In one embodiment, the consumer unit includes a storage device that can be used to store the electrical energy provided by the pressure surge transducer. For example, such a storage device is a battery or a capacitor.

In one embodiment, the generator unit comprises a first transmission unit connected to the power supply and the consumer unit comprises a second transmission unit connected to the pressure surge transducer. The first transmission unit and the second transmission unit, or a plurality of second transmission units among each other, can wirelessly exchange information among each other. For example, information may be passed from one second transmission unit to the next until it arrives at the first transmission unit. This allows lower transmission power of the individual transmission units. Well-known examples of such transmission systems in the radio frequency range are Bluetooth, WLAN, ZigBee, NFC, Wibree or WiMAX. Alternatively, higher-frequency pressure surges can be used to transmit information. In this case, the pressure surge transducer of the consumer unit is configured such that it can also be used as a pressure surge generator. Accordingly, the generator unit and each consumer unit comprise pressure sensors with which these higher-frequency pressure surges can be detected.

In one embodiment, the generator unit comprises a storage device with which the electrical energy provided by the power supply unit can be stored. Thus, the system can continue to function properly for a certain time even in the event of a power failure.

In one embodiment, the pressure surge generator comprises, for example, a loudspeaker or a piezo element or a motorized piston with which pressure surges can be generated from electrical energy. The pressure surge transducer comprises, for example, a microphone or a piezo element. Loudspeakers and microphones are characterized by comprising a diaphragm, a coil and a magnet, wherein either the magnet or the coil is connected to the diaphragm and a relative movement between the magnet and the coil inductively generates an electric current and wherein a changing current in the coil generates a changing magnetic field, which causes the magnet to move. The diaphragm may be made of plastic or metal.

Alternatively, a sandwich of metal and polymer layers can be used, which generates electrical energy when bent.

In one embodiment, the pressure surge generator comprises a compressed air connection and at least one valve with which pressure surges can be generated from compressed air. The compressed air connection can be connected to a pressure tank, which is connected to a compressed air pump, or it can be connected directly to a compressed air pump.

In one embodiment, the pressure surge generator is configured to generate pressure surges with amplitudes in the range of 0.1 to 1.0 bar and frequencies in the range of 0.5 to 5.0 Hertz. The pressure prevailing in the line can be increased or decreased. The pressure change can be linear or sinusoidal. The pressure surge transducer is configured to convert these pressure surges into electrical energy. As a result, the pressure prevailing in the fluid line, usually 3 to 4 bar, is increased or decreased by 0.1 to 1.0 bar for a duration of 0.1 to 1.0 seconds.

In one embodiment, the consumer unit comprises a controller that can send out corresponding information with the second transmission unit when the electrical energy stored in the storage unit falls below a predetermined value. The generator unit comprises a controller that can cause activation of the pressure surge generator based on information received from the first transmission unit.

The mentioned embodiments of the energy transmission system can be used in any combination, provided they do not contradict each other.

A sanitary system according to the invention comprises at least one fluid line and an energy transmission system according to any of the preceding embodiments.

In one embodiment, the generator unit is designed and arranged on the fluid line such that the pressure surge generator can transmit pressure surges directly to the fluid line. Alternatively, the pressure surges can be transmitted directly to the fluid located in the fluid line. Alternatively, the pressure surges can be transmitted to another fluid located between the pressure surge generator and the fluid. For example, the fluid is water and the further fluid is gas, or air. A movable wall or a membrane may be provided between the fluid and the further fluid.

In one embodiment, the consumer unit is designed and arranged on the fluid line in such a way that the pressure surge converter can convert pressure surges directly from the fluid line. Alternatively, the pressure surges can be converted directly from the fluid located in the fluid line (3). Alternatively, the pressure surges can be converted from the further fluid, or gas, located between the pressure surge generator and the fluid, or water. A movable wall or a membrane can be provided between the fluid and the further fluid.

Both the generator unit and the consumer unit may comprise a chamber which is connected to the inside of the line. The chamber can be filled with the fluid in the line and/or with another fluid.

The mentioned embodiments of the sanitary installation can be used in any combination, provided that they do not contradict each other.

BRIEF DESCRIPTION OF THE FIGURES

Exemplary embodiments of the present invention are explained in further detail below with reference to figures. These are for explanatory purposes only and are not to be construed restrictively. The figures show as follows.

DETAILED DESCRIPTION OF THE INVENTION

Figure 1:
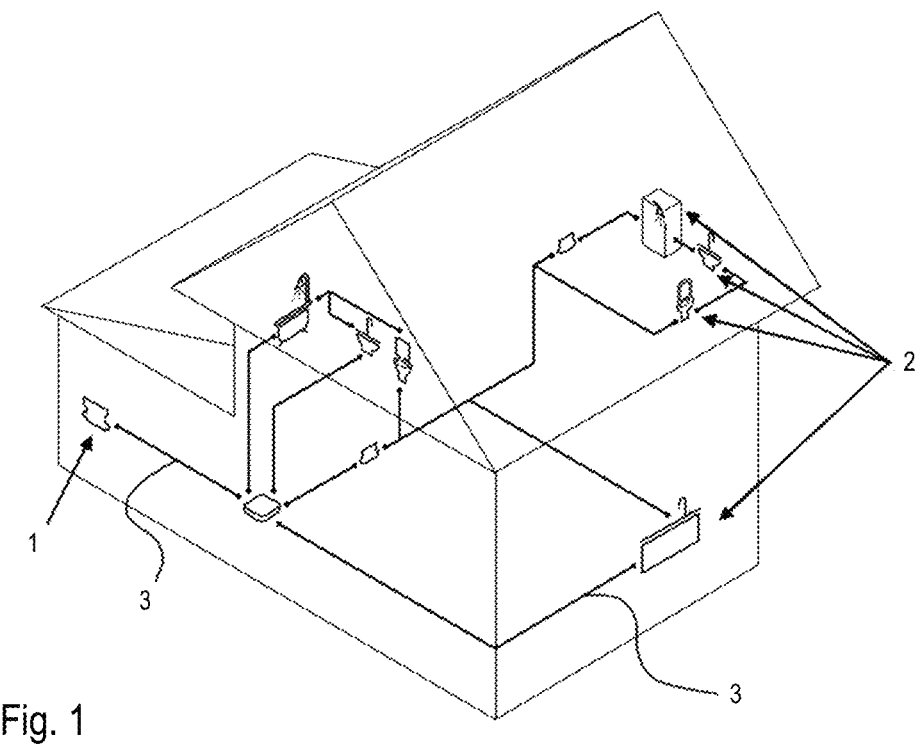
FIG. 1 shows a perspective view of a sanitary installation with an energy transmission system according to the invention.

FIG. 1 shows a perspective view of a sanitary installation having an energy transmission system according to the invention with a generator unit 1 and several consumer units 2, which are distributed in the building along one of the water lines 3 connected to the generator unit 1.

Figure 2:
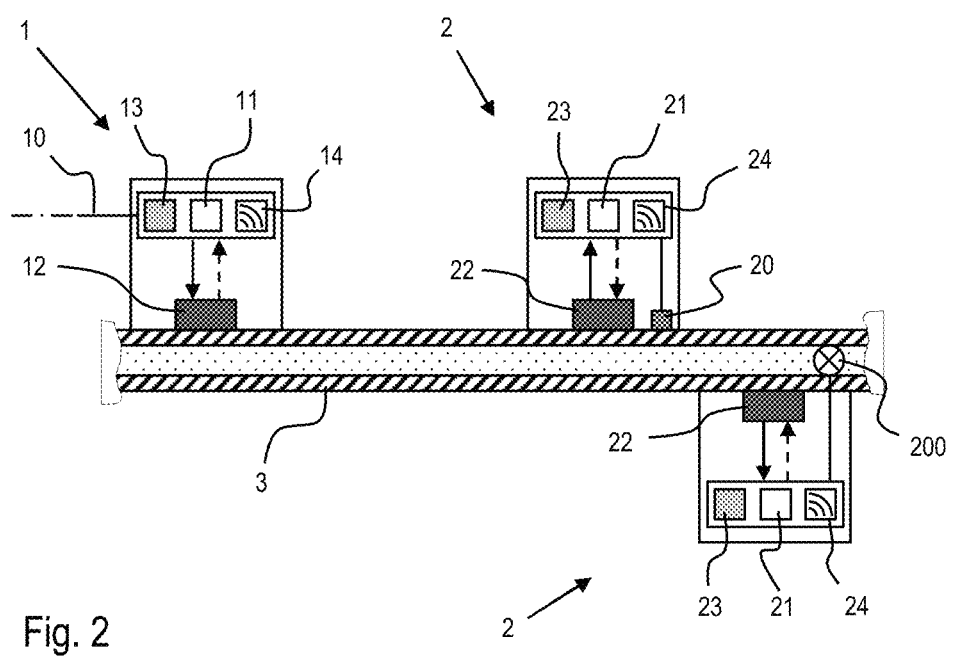
FIG. 2 shows a schematic sectional view of a first embodiment of the energy transmission system according to the invention.

FIG. 2 shows a schematic sectional view of a first embodiment of the energy transmission system according to the invention having a generator unit 1 and a first and a second consumer unit 2, which are arranged at a distance from each other and at a distance from the generator unit 1 on a common fluid line or water line 3. The generator unit 1 comprises a power supply unit 10, a controller 11, a pressure surge generator 12, a storage unit 13 and a first transmission unit 14, which are functionally interconnected. In the embodiment shown, the pressure surge generator 12 can transmit pressure surges directly to the outside of the water line 3. The consumer units 2 comprise a controller 21, a pressure surge transducer 22, a storage unit 23 and a second transmission unit 24. The upper consumer unit 2 shown in this figure additionally comprises a sensor 20 and the lower consumer unit 2 comprises an actuator 200. The pressure surge transducers 22 shown can take pressure surges directly from the outside of the water line 3 and convert them into electrical energy.

Figure 3:
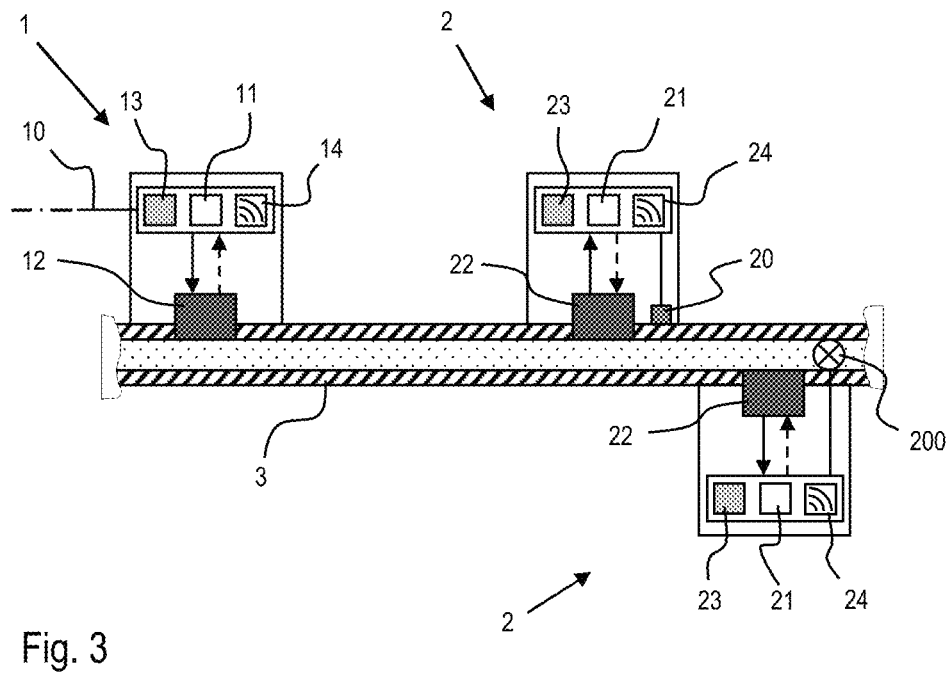
FIG. 3 shows a schematic sectional view of a second embodiment of the energy transmission system according to the invention.

FIG. 3 shows a schematic sectional view of a second embodiment of the energy transmission system according to the invention. The generator unit 1 and the consumer units 2 correspond essentially to those of FIG. 2. The generator unit 1 differs in that the pressure surge generator 12 is in direct contact with the fluid located in the fluid line 3. A corresponding recess is provided in the fluid line 3 for this purpose. The consumer unit 2 differs in that the pressure surge transducer 22 is in direct contact with the fluid located in the fluid line 3. A corresponding recess is also provided in the fluid line 3 for this purpose. The pressure surge generator, as well as the pressure surge transducer, may comprise a movable diaphragm or a movable piston head, which is in direct contact with the fluid.

Figure 4:
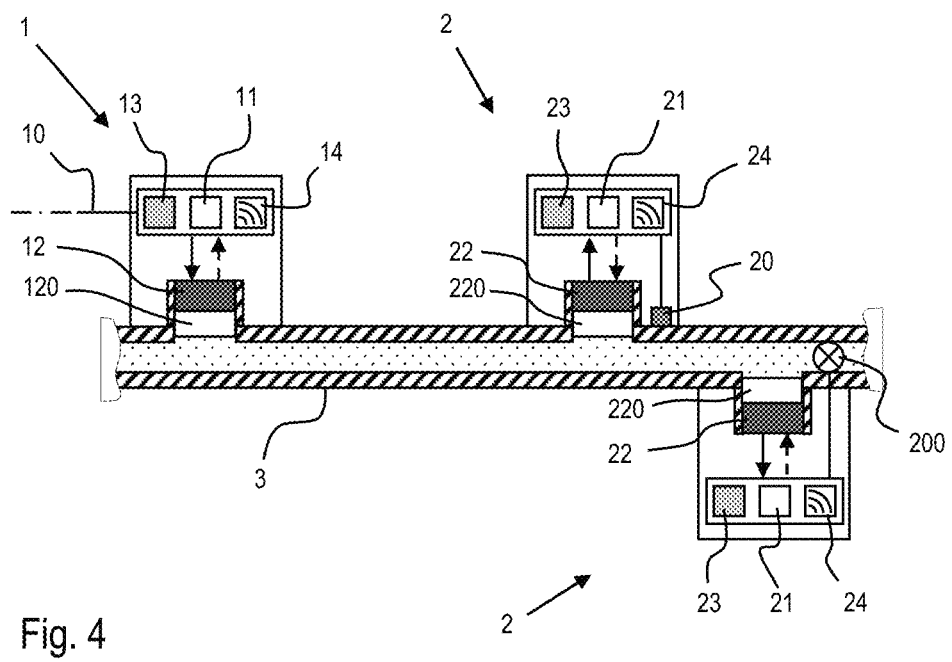
FIG. 4 shows a schematic sectional view of a third embodiment of the energy transmission system according to the invention.

FIG. 4 shows a schematic sectional view of a third embodiment of the energy transfer system according to the invention. In this embodiment, a chamber with a further fluid (gas/air) 120 is provided between the pressure surge generator 12 and the fluid (liquid/water), and the pressure surges can be transmitted from the pressure surge generator 12 directly to the gas 120, which further transmits them to the liquid. A chamber containing a gas 220 is provided between the pressure surge transducer 22 and the liquid, and pressure surges may be transmitted from the liquid to the gas 220 and from the gas 220 directly to the pressure surge transducer 22. The pressure surge generator, as well as the pressure surge transducer, may include a movable diaphragm or a movable wall, such as a movable piston head, which is in direct contact with the gas. A movable diaphragm or a movable chamber wall may be provided between the gas and the liquid.

| List of reference signs | |
| --- | --- |
| 1 Generator unit | 200 Actuator |
| 10 Power supply | 21 Controller |
| 11 Controller | 22 Pressure surge transducer |
| 12 Pressure surge generator | 220 Gas |
| 120 Gas | 23 Storage unit |
| 13 Storage unit | 24 Second transmission unit |
| 14 First transmission unit | 3 Water line |
| 2 Consumer unit | |
| 20 Sensor | |

The invention claimed is:

1. A plumbing installation with a water line (3) and an energy transmission system, comprising a generator unit (1) with a power supply unit (10), which can be arranged at a first location of the water line (3), and at least one consumer unit (2) having at least one consumer (20; 200), which can be arranged at a second location of the water line (3) spaced apart from the first location, wherein
the generator unit (1) comprises a pressure surge generator (12) which is connected to the power supply unit (10) and by means of which pressure surges can be generated which can be introduced into the water located in the water line (3), and in that
the consumer unit (2) comprises a pressure surge transducer (22) which is connected to the at least one consumer (20, 200), by means of which the pressure surges introduced into the water can be converted into electrical energy which can be supplied to the at least one consumer (20, 200),
wherein the consumer unit (2) comprises a storage unit (23) with which the electrical energy provided by the pressure surge transducer (22) can be stored.

2. The plumbing installation according to claim 1, wherein the at least one consumer comprises at least one sensor (20) and/or at least one actuator (200).

3. The plumbing installation according to claim 1, wherein the generator unit (1) comprises a first transmission unit (14) connected to the power supply unit (10) and wherein the consumer unit (2) comprises a second transmission unit (24) connected to the pressure surge transducer (22), wherein the first transmission unit (14) and the second transmission unit (24) or a plurality of second transmission units (24) can exchange information wirelessly between each other.

4. The plumbing installation according to claim 3, wherein the consumer unit (2) comprises a controller (21) that is adapted to send out corresponding information with the second transmission unit (24) when the electrical energy stored in the storage unit (23) falls below a predetermined value, and wherein the generator unit (1) comprises a controller (11) which is adapted to cause activation of the pressure surge generator (12) on the basis of information received from the first transmission unit (14).

5. The plumbing installation according to claim 1, wherein the generator unit (1) comprises a storage unit (13) with which the electrical energy provided by the power supply unit (10) can be stored.

6. The plumbing installation according to claim 1, wherein the pressure surge generator (12) comprises a loudspeaker or a piezoelectric element or a motorized piston, with which pressure surges can be generated from electrical energy, and wherein the pressure surge transducer (22) comprises a microphone or a piezoelectric element or a sandwich of metal and polymer layers.

7. The plumbing installation according to claim 1, wherein the pressure surge generator (12) comprises a compressed air connection and at least one valve, with which pressure surges can be generated from compressed air.

8. The plumbing installation m according to claim 1, wherein the pressure surge generator (12) and the pressure surge transducer (22) are capable of generating, or converting, pressure surges having amplitudes in the range of 0.1 to 1.0 bar and frequencies in the range of 0.5 to 5.0 Hertz.

9. The plumbing installation according to claim 1, wherein the generator unit (1) is designed and arranged on the water line (3) in such a way that the pressure surge generator (12) can transmit pressure surges directly to the water line (3) or can transmit them directly to the water located in the water line (3) or can transmit them to a further fluid (120; 220) located between the pressure surge generator (12) and the water.

10. The plumbing installation according to claim 1, wherein the consumer unit (2) is designed and arranged at the water line (3) in such a way that the pressure surge converter (22) can convert pressure surges directly from the water line (3) or can convert directly from the water located in the water line (3) or can convert from a further fluid (120; 220) located between the pressure surge generator (12) and the water.

* * * * *